US010939484B2

(12) United States Patent
Lu et al.

(10) Patent No.: US 10,939,484 B2
(45) Date of Patent: Mar. 2, 2021

(54) ESTABLISHING A BEARER SERVICE IN A TELECOMMUNICATIONS NETWORK

(71) Applicant: VODAFONE GMBH, Duesseldorf (DE)

(72) Inventors: Yang Lu, Duesseldorf (DE); Peter Wild, Krefeld (DE); Juergen Caldenhoven, Duesseldorf (DE)

(73) Assignee: VODAFONE GMBH, Duesseldorf (DE)

( * ) Notice: Subject to any disclaimer, the term of this patent is extended or adjusted under 35 U.S.C. 154(b) by 0 days.

(21) Appl. No.: 14/937,157

(22) Filed: Nov. 10, 2015

(65) Prior Publication Data

US 2016/0135238 A1 May 12, 2016

(30) Foreign Application Priority Data

Nov. 10, 2014 (EP) .................................. 14192506

(51) Int. Cl.
*H04W 76/12* (2018.01)
*H04W 48/18* (2009.01)
(Continued)

(52) U.S. Cl.
CPC ............. *H04W 76/12* (2018.02); *H04L 47/14* (2013.01); *H04W 12/04* (2013.01); *H04W 48/18* (2013.01);
(Continued)

(58) Field of Classification Search
CPC ... H04W 76/022; H04W 12/04; H04W 48/18; H04W 76/12; H04W 60/04; H04W 76/20; H04W 8/06; H04L 47/14
See application file for complete search history.

(56) References Cited

U.S. PATENT DOCUMENTS

2011/0075675 A1* 3/2011 Koodli .................... H04L 12/14
370/401
2011/0113278 A1* 5/2011 Yin ...................... H04L 12/4633
714/4.1
(Continued)

FOREIGN PATENT DOCUMENTS

WO 2014160935 A2 10/2014

OTHER PUBLICATIONS

"3rd Generation Partnership Project: Technical Specification Group Services and System Aspects; General Packet Radio Service (GPRS) Enhancements for Evolved Universal Terrestrial Radio Access Network (E-UTRAN) Access (Release 13)" 3GPP Draft; 23401-D00, 3rd Generation Partnership Project (3GPP), Mobile Competence Centra; 650, Route Des Lucioles; F-06921 Sophia-Antipolis Cedex, France, 2014, 318 pgs.
(Continued)

*Primary Examiner* — Quoc Thai N Vu
(74) *Attorney, Agent, or Firm* — Grossman, Tucker, Perreault & Pfleger, PLLC

(57) ABSTRACT

Method for establishing an EPS Bearer for a mobile terminal (UE, 200, 400) in a telecommunications network (240, 280, 440, 480), and a packet data network gateway (PGW, 260, 460) receives and analyses a negative response message from a charging system (OCS/PCRF, 270, 470), characterized in that, when an update location procedure of the mobile terminal (UE, 200, 400) is successfully completed in the telecommunications network (240, 280, 440, 480), the packet data network gateway (260, 460) transmits a message (via the signaling gateway, SGW) to a Mobility Management Entity (MME, 220, 420), whereby the message comprises a bearer activation key, the mobility management entity activates an EPS bearer between the telecommunica-
(Continued)

tions network and the mobile terminal by using the received bearer activation key.

13 Claims, 5 Drawing Sheets

(51) Int. Cl.
*H04L 12/801* (2013.01)
*H04W 12/04* (2021.01)
*H04W 60/04* (2009.01)
*H04W 76/20* (2018.01)
*H04W 8/06* (2009.01)

(52) U.S. Cl.
CPC .............. *H04W 60/04* (2013.01); *H04W 8/06* (2013.01); *H04W 76/20* (2018.02)

(56) References Cited

U.S. PATENT DOCUMENTS

| 2011/0170517 | A1* | 7/2011 | Bakker | H04W 36/0033 370/331 |
| 2014/0342735 | A1* | 11/2014 | Liao | H04W 60/06 455/435.1 |

OTHER PUBLICATIONS

"Issue and Solution to Non-Availability of Services Due to LTE-Roaming", 3GPP TSG CT WG1 Meeting #88bis, Sophia Antipolis, France, Oct. 20-24, 2014, 6 pgs.

"Additional Cause Code Mapping for Non-Availability of Services Due to LTE-Roaming", 3GPP TSG CT4 Meeting #66bis, Sophia Antipolis, France, Oct. 20-24, 2014, 4 pgs.

* cited by examiner

| Octets | Bits | | | | | | | |
|---|---|---|---|---|---|---|---|---|
| | 8 | 7 | 6 | 5 | 4 | 3 | 2 | 1 |
| 1 | Type = 80 (decimal) ||||||||
| 2-3 | Length = n ||||||||
| 4 | Bearer Indicator |||| Instance ||||
| 5 | Spare | PCI | PL ||| Spare | PVI ||
| 6 | Label (QCI) ||||||||
| 7 to 11 | Maximum bit rate for uplink ||||||||
| 12 to 16 | Maximum bit rate for downlink ||||||||
| 17 to 21 | Guaranteed bit rate for uplink ||||||||
| 22 to 26 | Guaranteed bit rate for downlink ||||||||
| 27 to (n+4) | These octet(s) is/are present only if explicitly specified ||||||||

Fig.5a

| Octets | Bits | | | | | | | |
|---|---|---|---|---|---|---|---|---|
| | 8 | 7 | 6 | 5 | 4 | 3 | 2 | 1 |
| 1 | Type = 97 (decimal) ||||||||
| 2 to 3 | Length = n ||||||||
| 4 | Bearer Indicator (I) |||| Instance ||||
| 5 | Bearer Indicator (II) |||| ASI | Vind | VB | PPC |
| 6-(n+4) | These octet(s) is/are present only if explicitly specified ||||||||

Fig.5b

ESTABLISHING A BEARER SERVICE IN A TELECOMMUNICATIONS NETWORK

TECHNICAL FIELD

The invention relates to a method for establishing an EPS bearer for a mobile terminal in a telecommunications network.

The invention further relates to a packet data network gateway for establishing an EPS bearer for a mobile terminal in a telecommunications network according to a method of the present invention and a mobility management entity for establishing an EPS bearer for a mobile terminal in a telecommunications network according to a method of the present invention.

BACKGROUND INFORMATION

When a mobile terminal of a customer or a user attempts to register in a telecommunications network such as a Long Term Evolution (LTE) network and the customer does not hold a valid LTE data service or has no credit on his LTE-account the mobile terminal of the customer will not be able to successfully register in the LTE-network. The customer will not receive any information on the display of the mobile terminal informing him about a reason, for example that no bucket is booked for data service on his account. If the mobile terminal stays in the LTE-network, it will repeat the attach procedure or registering for several times with no success and consequently the customer will not get any service.

In case of a customer roaming in an LTE telecommunications network (LTE: Long Term Evolution) in another country the same situation arises, which means the customer will not get any service. Furthermore, he is not able to change this disadvantageous situation, for example booking the required data service via his mobile terminal because he is not registered and therefore not connected to the LTE-network.

In a roaming situation today in a GSM or UMTS telecommunications network (GSM: Global System for Mobile Communications; UMTS: Universal Mobile Telecommunications System) it is possible that a customer receives a short message informing him about a missing data package. This is done in the GSM or UMTS telecommunications network via a CS domain (CS: circuit-switched). The reason for this is that the GSM or UMTS telecommunications network provides the CS domain as well as a PS domain (PS: packet-switched). In the LTE telecommunications network the CS domain does not exist, which means such a short message cannot be send via such CS domain. By answering this short message with a special keyword and sending it back via the CS domain to the network provider the customer would be able to use the freshly booked data service. Additionally, this service would only work, if the mobile or user equipment were registered in a network.

SUMMARY OF THE DISCLOSURE

In spite of this it is an object of the present invention to avoid the drawbacks of the prior art and to provide a method for establishing an EPS bearer for a mobile terminal in a telecommunications network, which improves the customer network experience, especially in a roaming scenario.

The object is achieved by a method for establishing an EPS Bearer for a mobile terminal in a telecommunications network characterized in that when an update location procedure of the mobile terminal is completed in the telecommunications network, the packet data network gateway transmits a message to a mobility management entity (MME), whereby the message comprises a bearer activation key, the mobility management entity activates the EPS bearer between the telecommunications network and the mobile terminal by using the received bearer activation key.

In a further embodiment of the method the bearer activation key allows an establishing of an EPS bearer with directivity for a connection between the telecommunications network and the mobile terminal.

In an advantageous embodiment of the method the connection between the telecommunications network and the mobile terminal is downlink and/or uplink.

The invention involves the idea to provide a mechanism that introduces a connection characteristic or directional attributes for such a connection or EPS bearer (EPS: Evolved Packet System) after a packet data network gateway receives and analyses a negative response message from a charging system. This allows activating only one direction of an established connection or EPS bearer for signaling traffic between the telecommunications network and the mobile terminal, before any data traffic can be sent between them.

Thus, this mechanism allows activating a specified direction of the EPS bearer triggered by a directional attribute, for example a bearer activation key indicating a directivity, for example in a downlink direction, which is from the telecommunications network to the mobile terminal or in a uplink direction, which is from the mobile terminal to the telecommunications network.

In a roaming situation a Default EPS bearer is a very first packet data network connection to be established between the telecommunications network and the mobile terminal. The present invention will not change the characteristic that the EPS bearer, preferably a Default EPS bearer is bidirectional. Using the method this additional bearer attribute or characteristic added to the EPS bearer, the mobility management entity will block requests for mobile originated data service on one side, but not for signaling requests and allowing the telecommunications network initiating a signaling or data service in case of an established EPS bearer with directivity such as downlink.

The mechanism also works in the uplink only direction, which means the network initiates an uplink only connection for the mobile terminal.

It is an advantage of the invention that the present invention is performed with the state-of-the-art initial EPS attach procedure in terms of the signaling flows, which allows an easy and fast execution of the procedure, because no new message types are introduced. Using the method, the mobile terminal is still allowed to request access for the mobile originating signaling. This will ensure the mobile terminal performing a Tracking Area Update procedure towards the network while entering a new network area and thus the mobility management is assured.

Using the method, it is a further advantage that the network can flexibly handle the situation where multiple APNs are used for different services such as web-based service, Voice over LTE service, the Proximity-based Services (ProSe) Device-to-device (D2) services or the push-to-talk service (MCPTT).

For example, the Voice over LTE service can be (un) charged independent of whether the customers have validly booked data service. This flexibility provides the possibility for mobile network operators to reuse the existing charging model for circuit switched voices calls for IP-based VoIte calls.

An Evolved Packet System network is an IP-based connection-oriented telecommunications network, which requires the establishment of a connection or also called "virtual" connection, which is called EPS Bearer. This connection is established between two endpoints such as a mobile terminal and a packet data network gateway (PGW) via an eNodeB and a signaling gateway (SGW). An EPS virtual connection or EPS bearer is characterized by a traffic flow between two endpoints. An endpoint is for example a mobile terminal 200 or a packet data network gateway 260. Furthermore, the EPS bearer is defined by a quality of service Class Index (QCI) that describes the type of service that makes use of the virtual connection or EPS bearer, for example conversational voice, streaming video, signaling or best effort. Inside each network element like a signaling gateway, packet data network gateway, mobility management entity or mobile the QCI points to pre-configured quality of service (QoS) attributes. These QoS attributes describe the type of transport service provided by the virtual connection or EPS bearer. Optionally, a flow specification is specified that describes the guaranteed and maximum bitrate (GBR, MBR) of the aggregate traffic flow that goes through the virtual connection or EPS bearer. After establishing the first connection or the Default EPS Bearer a filter specification for other types of EPS bearer are specified that describes the traffic flows in terms of IP addresses, protocols or port numbers for which the transport service is provided between the two endpoints, for example a data service is to be transported. The traffic flow to be transmitted between the two endpoints can be either bidirectional, which means Uplink and Downlink traffic are permitted to use an established EPS bearer or unidirectional, which means Uplink or Downlink traffic is permitted to use the established EPS default bearer for a user data service.

In a further advantageous embodiment the bearer activation key comprises a bearer indicator and/or a cause code.

In a further embodiment the bearer activation key is implemented in a Bearer Context Created Information Element of the Create Session Response Message.

In a further embodiment the Bearer Context Created Information Element is a Bearer Quality of Service Information Element or a Bearer Flag Information Element.

In a further embodiment, if the Bearer Quality of Service Information Element is chosen, the bearer indicator is located in at least one of the bits of octet 4 of the Bearer Quality of Service Information Element.

In a further advantageous embodiment it is suggested, if the Bearer Flag Information Element is chosen, the bearer indicator is located in at least one of the bits of Octet 4 or octet 5 of the Bearer Flag information Element.

In a further embodiment it is suggested for the inventive method if the mobility management entity does not receive a bearer indicator or the mobility management entity is not enabled to use such a bearer indicator, the mobility management entity maps the cause code with a corresponding bearing indicator for establishing an EPS bearer with directivity.

In a further embodiment of the inventive method after mapping the cause code with the corresponding bearer indicator, the mobility management entity stores the mapped bearer indicator.

In a further embodiment of the inventive method the mobility management entity send an Attach Accept Message together with an Activate EPS Bearer Message to the mobile terminal, whereby the Activate EPS Bearer Message comprises the stored bearer indicator.

According to a further aspect of the present invention a packet data network gateway for establishing an EPS Bearer for a mobile terminal in a telecommunications network is provided, characterized in that said gateway comprises a logic means for deciding and initiating a transmitting of a message to a mobility management entity, wherein the message comprises a bearer activation key for establishing an EPS bearer.

In an advantageous embodiment the packet data network gateway said is adapted to perform the method steps according to claims 1 to 8 performed by such a packet data network gateway.

According to a further aspect of the present invention a Mobility Management Entity for establishing an EPS Bearer for a mobile terminal in a telecommunications network is provided, characterized in that said mobility management entity is adapted to perform the method steps according to claims 1 to 11 performed by such mobility management entity.

In an advantageous embodiment the mobility management entity comprises means for mapping a received cause code to a corresponding bearer indicator for establishing an EPS bearer with directivity.

The afore-mentioned and other aspects of the invention will be apparent from and elucidated with reference to the embodiments described hereinafter making reference to the accompanying drawings.

BRIEF DESCRIPTION OF THE DRAWINGS

These and other features and advantages will be better understood by reading the following detailed description, taken together with the drawings wherein:

FIG. 5*a* a structural diagram of the Quality of service bearer information element according to the present invention; and FIG. 5*b* a structural diagram of the Bearer Flag information element according to the present invention.

DETAILED DESCRIPTION

Figure 1:
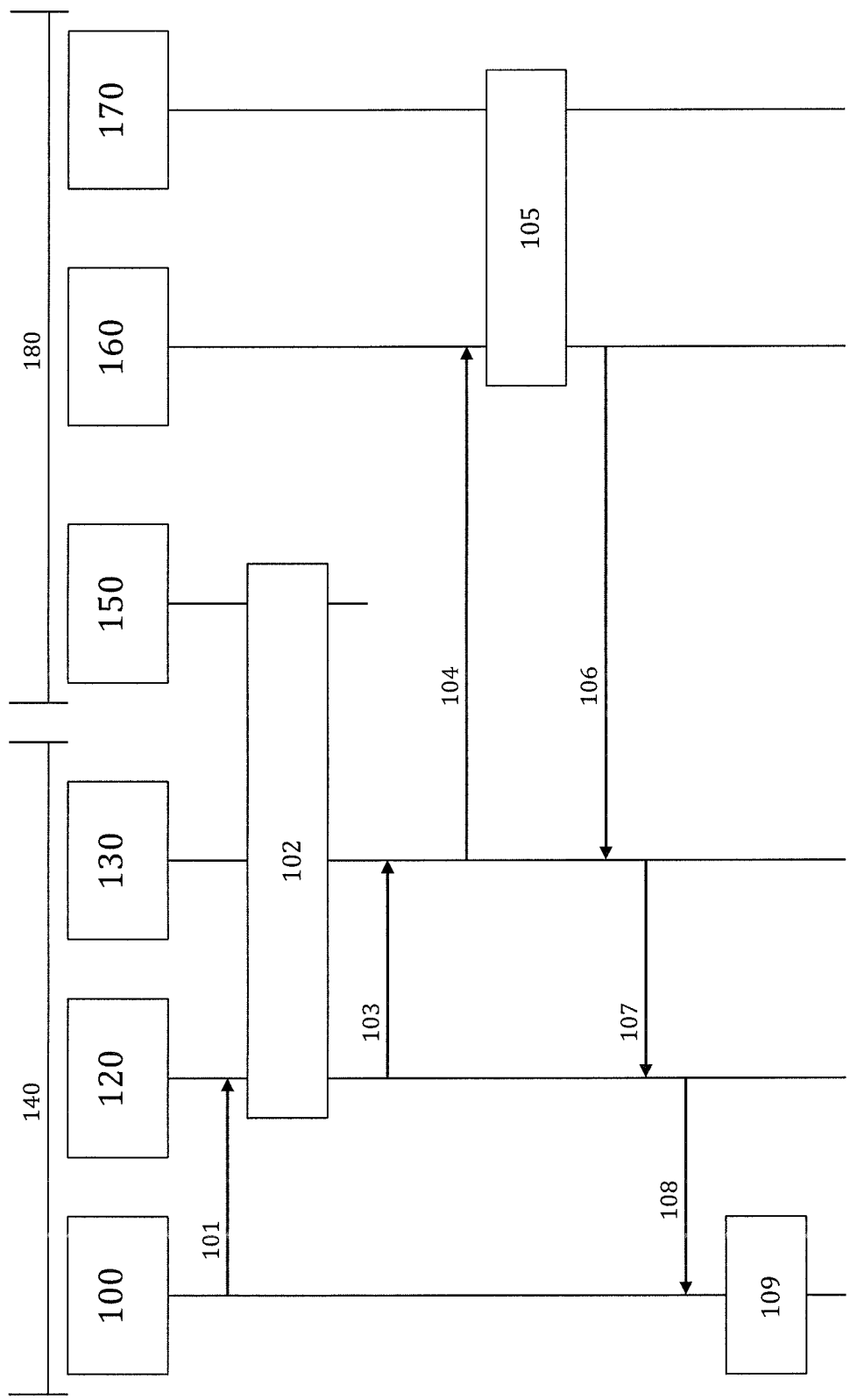
FIG. 1 a prior art signal flow for an attach procedure according to 3GPP standard TS 23.401.

FIG. 1 shows a prior art signal flow for an attach procedure according to 3GPP standard TS 23.401. A mobile terminal 100, respectively user equipment (UE) attempts to attach in a telecommunications network 140, 180.

The telecommunications network 140, 180, for example a public land mobile network 140, 180 comprises a home public land mobile network 140, 180 or in case of a roaming scenario the telecommunications network 140, 180 comprises a visited public land mobile network 140 and a home public land mobile network 180. The telecommunications network 140, 180 comprises at least a mobile terminal respectively user equipment (UE) 100, a mobility management entity (MME) 120, a signaling gateway (SGW) 130, a home subscriber server (HSS) 150, a packet data network gateway (PGW) 160 and a charging system, especially at least an online charging system (OCS) 170 and a Policy and Charging Rules Function (PCRF) 170.

The mobile terminal 100, for example an inbound roamer to a telecommunications network 140, 180 camps on a LTE cell of a public land mobile network 140 and sends an Attach Request message in step 101 with a piggybacked session management packet data network connectivity request message to the mobility management entity 120.

In step 102, an update location procedure with the home subscriber server 150 is completed respectively successfully done. After that the mobility management entity 120 sends a Create Session Request message in step 103 to the signaling gateway 130. The signaling gateway 130 sends the Create Session Request in step 104 to the packet data network gateway 160.

In step 105 the packet data network gateway 160 sends a credit control request message to the charging system 170, which comprises at least the online charging system 170 and the policy and charging rules function 170. The online charging system 170 responses to the packet data network gateway 160 with a credit control answer message. This credit control answer message may comprise a positive or a negative answer. A negative answer could be given when the customer has not subscribed to a dedicated service, for example with the meaning "no data bucket booked" or "no data bucket booked for roaming" or "not enough credit for service".

In step 106, based on the credit control answer message the PGW 160 sends a Create Session Response comprising a cause code, for example in case of a negative answer the GPRS Tunneling Protocol (GTP) cause code #29, which means "User authentication failed" back to the signaling gateway 130. The gateway 130 sends the Create Session Response in step 107 with cause code #92 to the MME 120.

In step 108, the MME 120 sends an Attach Reject Message with EMM (EMM: EPS Mobility Management; EPS: Evolved Packet System) reject cause code #19 "ESM failure" and a piggybacked packet data network connectivity reject message with a ESM (ESM: EPS Session Management) reject cause code #29 "User authentication failed" to the mobile terminal 100. EMM states describe the Mobility Management states that result from the mobility management procedures e.g. in Attach and Tracking Area Update procedures. The EPS Session Management (ESM) protocol provides procedures for the handling of EPS bearer contexts. Cause code #19 and Cause code #29 are used by the telecommunications network 140, 180 to indicate that the requested service was rejected by the external packet data network due to a failed user authentication. From the telecommunications network perspective with that the attach request is rejected.

In step 109 the mobile terminal 100 may then perform cell reselection or network search, if staying in a LTE cell of a LTE telecommunications network or public land mobile network or visited public land mobile network the mobile terminal 100 will not get any service after several attempts of sending attach requests 101. This leads to an additional usage of signaling resources between the UE and the telecommunications network.

Figure 2:
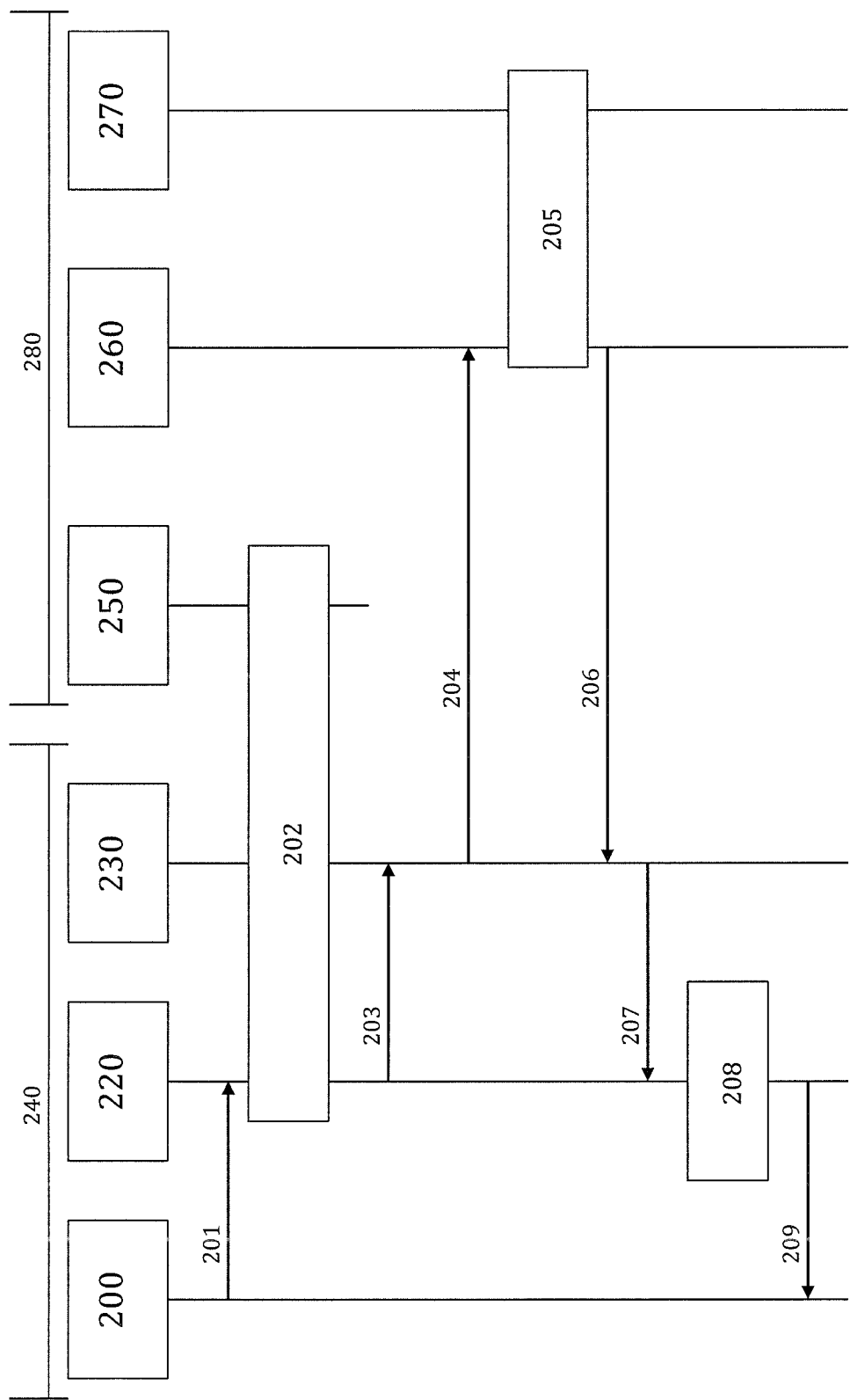
FIG. 2 a signal flow diagram for an attach procedure according to the present invention.

FIG. 2 depicts a signal flow diagram for an attach procedure according to the present invention. A mobile terminal 200, respectively user equipment (UE) attempts to attach in a telecommunications network 240, 280.

The telecommunications network 240, 280, for example a public land mobile network 240, 280 comprises a home public land mobile network 240, 280 or in case of a roaming scenario the telecommunications network 240, 280 comprises a visited public land mobile network 240 and a home public land mobile network 180. The telecommunications network 240, 280 comprises at least a mobile terminal respectively user equipment (UE) 200, a mobility management entity (MME) 220, a signaling gateway (SGW) 230, a home subscriber server (HSS) 250, a packet data network gateway (PGW) 260 and a charging system, especially at least an online charging system (OCS) 270 and a Policy and Charging Rules Function (PCRF) 270.

The mobile terminal 200, for example an inbound roamer to a telecommunications network 240, 280 camps on a LTE cell of a public land mobile network 240 and sends an Attach Request message in step 201 with a piggybacked session management packet data network connectivity request message to the mobility management entity 220.

In step 202, an update location procedure with the home subscriber server 250 is completed, respectively successfully done.

After that the mobility management entity 220 sends a Create Session Request message in step 203 to the signaling gateway 230.

The signaling gateway 230 sends the Create Session Request in step 204 to the packet data network gateway 260.

In step 205 the packet data network gateway 160 sends a credit control request message to the charging system 270, which comprises at least the online charging system 270 and the policy and charging rules function 270. The online charging system 270 responses to the packet data network gateway 260 with a credit control answer message. This credit control answer message may comprise a positive or a negative answer. A negative answer could be given when the customer has not subscribed to a dedicated service, for example with the meaning "no data bucket booked" or "no data bucket booked for roaming" or "not enough credit for service".

In step 206, based on the credit control answer message the PGW 260 sends a Create Session Response. Instead of just including a cause code, for example GTP cause code #92, the PGW 260 uses a bearer activation key, respectively a bearer activation information for establishing an EPS bearer for the mobile terminal 200 in a telecommunications network 240, 280.

The used bearer activation key comprises a bearer indicator and/or a cause code. The bearer indicator allows an establishing of an EPS bearer with directivity for a connection between the telecommunications network 240, 280 and the mobile terminal 200, preferably concerning downlink and/or uplink. The comprised cause code is usable by the MME 220 for establishing an EPS bearer with directivity for the connection between the telecommunications network 240, 280 and the mobile terminal 200. The MME 220 maps the cause code to a corresponding bearer indicator for establishing an EPS bearer with directivity for the connection between the telecommunications network 240, 280 and the mobile terminal 200, preferably concerning downlink and/or uplink. The usage of both, a bearer indicator and a cause code together as a bearer activation key, is advantageous in cases of telecommunications networks where the MME and the PGW in a public land mobile network might only be able using one of these both.

The bearer indicator of the bearer activation key is preferably implemented in the Bearer Context Created Information Element of the Create Session Response message 206, especially in the Bearer Quality of Service Information Element or in the Bearer Flag Information Element (Compare for example FIG. 5a and FIG. 5b). The value part of either information element is used or copied by the PGW 260, SGW 230 and MME 220 and consequently transmitted in the messages of steps 206 in the telecommunications network 240, 280.

If the Bearer Quality of Service Information Element is chosen the bearer indicator is located in bits 5 and 6 of octet 4 as shown in the embodiment according to FIG. 5a. Depending on the combination of these two bits in octet 4 the bearer indicator indicates to the SGW 230, PGW 260 and MME 220 a connection established for the mobile terminal 200. For example, one combination of these two bits indicates a unidirectional connection such as a "downlink only" direction, which is from the network to the terminal 200 or an "uplink only" direction, which is from the terminal 200 to the network.

Alternatively, if the Bearer Flag Information Element is chosen in steps 206 the bearer indicator is preferably located in bits 5 and 6 of octet 4 or octet 5 as for example shown in the embodiment according to FIG. 5b. Depending on the combination of these two bits in octet 4 or octet 5 the bearer indicator indicates to the SGW 230, PGW 260 and MME 220 a connection established for a mobile terminal 200. For example, one combination of these two bits indicates a unidirectional connection such as a "downlink only" direction, which is from the network to the terminal 200 or as an "uplink only" direction, which is from the terminal 200 to the network.

The SGW 230 sends the Create Session Response Message in step 207 with bearer activation key to the MME 220. The bearer activation key comprises the bearer indicator and/or the cause code.

If the MME 220 receives a bearer indicator with the bearer activation key in the Create Session Response Message in step 208 it stores the received bearer indicator. If the MME 220 does not receive a bearer indicator or the MME 220 is not enabled to use such a bearer indicator, the MME 220 in step 208 maps the cause code with a corresponding bearer indicator according to a pre-configured bearer directivity table stored in the MME 220 and stores the mapped bearer indicator. The mapping table shows:

| Cause code CC# | Bearer Directivity Indicator; Direction |
|---|---|
| CC #abc | Both directions, UL and DL |
| CC #klm | One direction only, DL |
| CC #xyz | One direction only, UL |

Instead of sending an Attach Reject message in step 108 as described in FIG. 1, in step 209, the MME 220 sends an Attach Accept message to the mobile terminal 200. The stored bearer indicator is included in the Activate Default EPS Bearer Context Request message for the mobile terminal 200, which is sent together with the Attach Accept message. With that the mobile terminal 200 is successfully registered in the telecommunications network 240 and the EPS Bearer is established, for example as a unidirectional connection such as a downlink only bearer service, which means in the direction from the gateway 260 to the mobile terminal 200. This allows the gateway 260 to send signaling messages or data messages as data traffic to the mobile terminal 200 via the established Default EPS Bearer, which is downlink direction.

Figure 3:
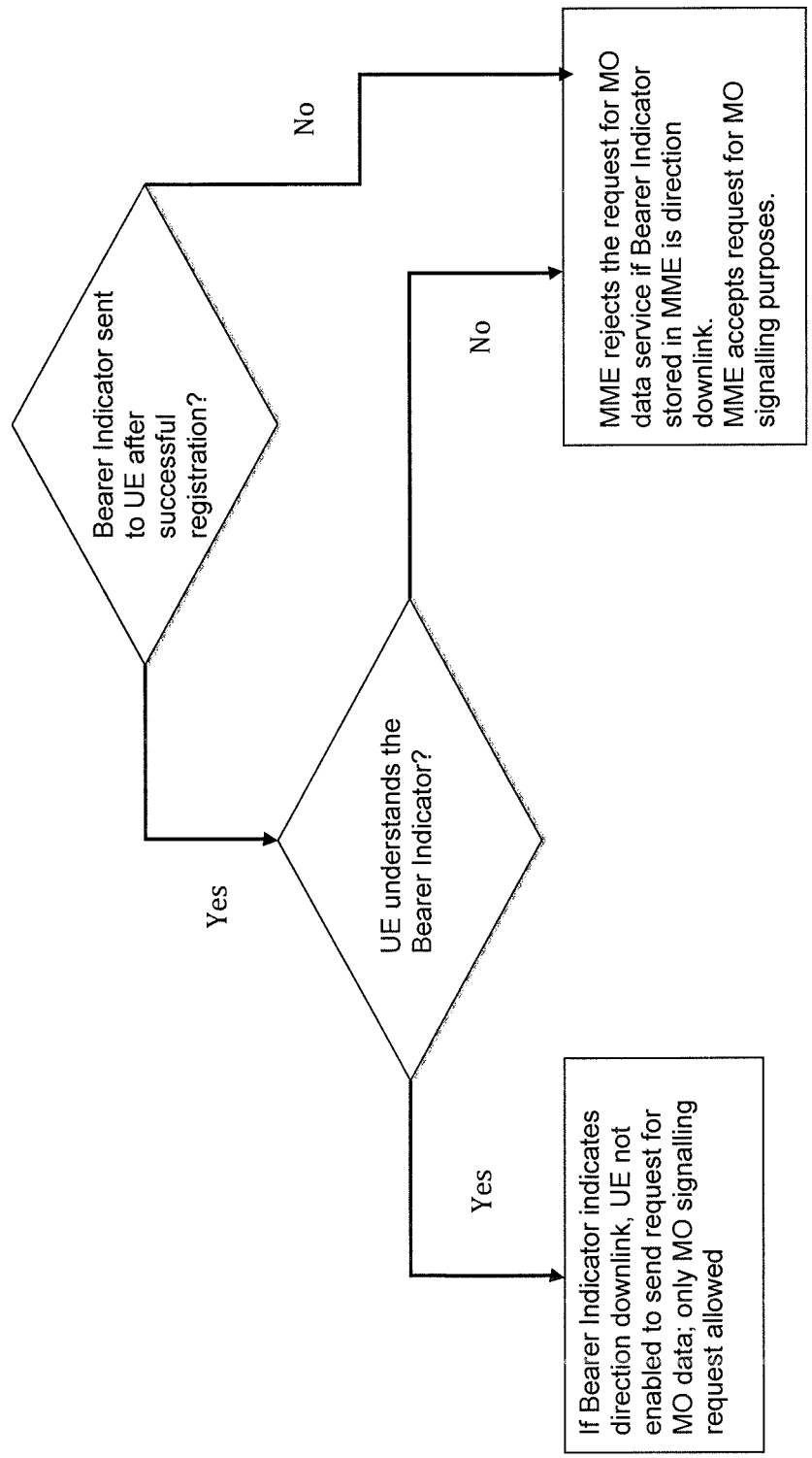
FIG. 3 in a schematic diagram a further embodiment of the present invention.

With such completed attach procedure the terminal 200 is able to send a request for the mobile originating signaling, but the terminal 200 is not enabled to send a request for mobile originating data, also further described in FIG. 3, because the EPS bearer is only activated or established in one direction, which is downlink only from the network to the terminal 200. The network, for example the gateway 260 is enabled to send signaling messages or data messages.

FIG. 3 shows in a schematic diagram a further embodiment of the present invention, which allows understanding the behavior of a legacy terminal or an upgraded or new terminal when using a method of the present invention. For example, the MME can send an Attach accept message and an Activate Default EPS Bearer Context Request message without including the bearer indicator.

In case no bearer indicator is sent from the MME to the UE, the MME blocks or rejects a request for mobile originating data from the UE. The MME accepts a request for mobile originating signaling purposes.

In case a bearer indicator is sent from the MME to the UE and the UE is not capable to read or understand the bearer indicator, the MME blocks or rejects a request for mobile originating data from the UE. The MME accepts a request for mobile originating signaling purposes.

In case a bearer indicator is sent from the MME to the UE and the terminal is capable to read or understand the bearer indicator, the UE is not enabled to send a request for mobile originating data, but is enabled for a request for mobile originating signaling.

Figure 4:
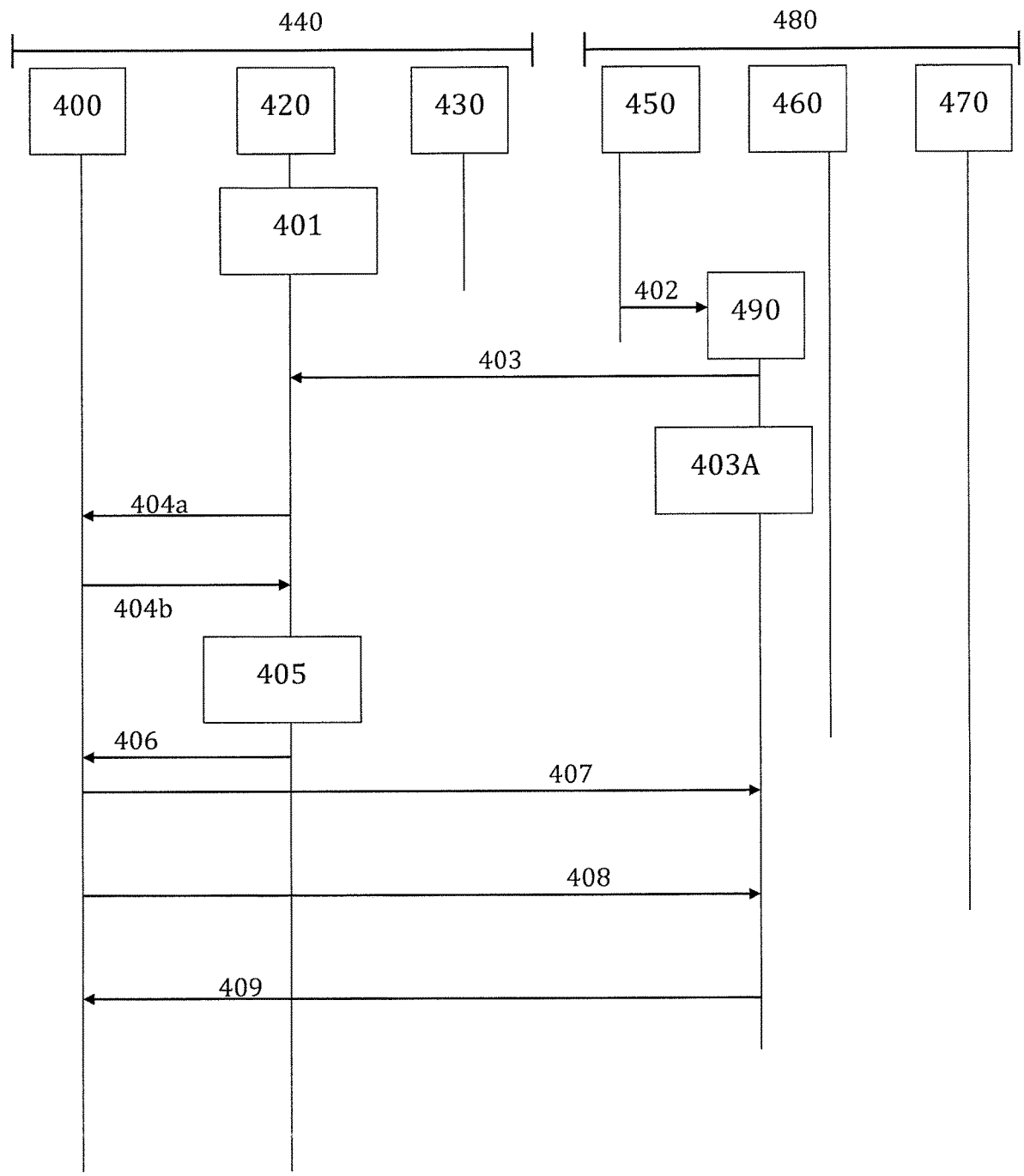
FIG. 4 a schematic flow diagram of an embodiment of the method after the mobile terminal is successfully registered and the Default EPS Bearer is established as downlink only bearer service.

FIG. 4 depicts a schematic flow diagram of an embodiment of the method of the present invention after the mobile terminal is successfully registered and the Default EPS Bearer is established as downlink only bearer service.

The telecommunications network 440, 480, for example a public land mobile network 440, 480 comprises a home public land mobile network 440, 480 or in case of a roaming scenario the telecommunications network 440, 480 comprises a visited public land mobile network 440 and a home public land mobile network 180. The telecommunications network 440, 480 comprises at least a mobile terminal respectively user equipment (UE) 400, a mobility management entity (MME) 420, a signaling gateway (SGW) 430, a home subscriber server (HSS) 450, a packet data network gateway (PGW) 460 and a charging system, especially at least an online charging system (OCS) 470 and a Policy and Charging Rules Function (PCRF) 470.

In step 401 the mobile terminal 400 is successfully registered in the telecommunications network as already described in step 209 of FIG. 2. With that a communication between the telecommunications network 440, 480 and the mobile terminal 400 or the customer is possible, for example preferably about the lack of the booked buckets for the data services, especially in case of a roaming scenario.

In step 402 the home subscriber server 450 in the telecommunications network 480 informs the SMS center 490 about the successful registration of the mobile terminal 400.

In step 403 after receiving the message from the HSS 450 the SMS center 490 sends a short message, for example a welcome message, via the established EPS bearer to the MME 420. This allows the network to start the communication with the customer. Block 403A gives an example for a text for the short message sent in step 403 such as "no data service booked or not enough credit for the requested data service. Do you want to book? Please send an answer message with XYZ".

In step 404a, based on the bearer indicator, which indicates a direction downlink for the established EPS Bearer, the MME sends a paging message to the UE, which is possible since the downlink connection from the telecommunications network 440, 480 to the UE 400 is enabled.

In step 404b the UE 400 sends a service request for signaling to the MME 420, based on the mobile terminated paging of the MME 420.

In step 405 the MME 420 accepts the request for signaling (step 404b), since the UE 400 is allowed to send a service request for signaling after establishing the unidirectional Default EPS bearer.

In step 406, the MME 420 sends the received short message (step 403) with the text of block 403A via the established downlink connection or EPS bearer.

If the customer in step 407 confirms or answers the short message with a positive response, for example sending a short message answer containing "yes", and the UE 400 transmits this answer message (step 407) the policy and charging rules function 470 receives the positive message via the telecommunications network 440, 480. The charging system 470 then triggers an update procedure for modifying the established EPS bearer in a way that the connection or EPS bearer between the UE 400 and the PGW 460 is changed from a unidirectional connection to a bi-directional connection or EPS bearer, which means uplink and downlink direction are activated according to the specified bearer attributes, for example according to the specified Bearer Quality of Service in the corresponding information element.

If the customer replies with a negative answer message as shown in step 408, for example via a short message containing the word "no", the customer then receives a further answer message in step 409 on his UE 400 from the telecommunications network 440, 480. The SMS center 490 then sends in step 409 a short message with the text "you are not able to get any data service on LTE. Please, disable the LTE module in your terminal and try to register via a GSM or 3G network." This allows the network provider to inform the customer on his UE 400 about the situation and furthermore also improves the customer experience, which is not given in the prior art.

FIG. 5a shows an inventive embodiment of the Bearer Quality of Service Information Element based on the 3GPP TS 29.274.

FIG. 5a depicts the structure of the Bearer Quality of Service Information Element of the present invention. With the inventive method the Bearer Context Created Information Element in the Create Session Response message and the Bearer Request message are modified by implementing the bearer activation key via the bearer indicator. The Bearer Quality of Service (Bearer QoS) is transferred via GTP tunnels. If the Quality of Service Bearer Information Element is chosen for the bearer indicator, bits 5 and 6 of octet 4 are representing the bearer indicator of the bearer activation key. According to the following table below bits 5 and 6 in octet 4 contain the bearer indicator indicating to the telecommunications network which direction to be activated or established. Alternatively, only one bit, for example bit 6 can be used as a bearer indicator, if less use cases are supposed be supported. This allows an easy implementation in the message formats.

TABLE

Bearer Indicator in Bearer QoS IE

| Bearer indicator | | |
| --- | --- | --- |
| Bit 6 | Bit 5 | Direction |
| 0 | 0 | Both directions, UL and DL |
| 0 | 1 | One direction only, DL |
| 1 | 0 | One direction only, UL |
| 1 | 1 | Not used |

FIG. 5b shows an inventive embodiment of the Bearer Flag Information Element based on the 3GPP TS 29.274.

FIG. 5b depicts the structure of the Bearer Flag information element of the present invention as an alternative embodiment. If the Bearer Flag Information Element is chosen for the bearer indicator, bits 5 and 6 of octet 4 or octet 5 are representing the bearer indicator. According to the following table below bits 5 and 6 in octet 4 or octet 5 contain the bearer indicator indicating to the telecommunications network which direction to be activated or established. Alternatively, only one bit for example bit 6 in octet 4 or octet 5 can be used as a bearer indicator, if less use cases are supposed to be supported. This allows an easy implementation in the message formats.

TABLE

Bearer Indicator in Bearer Flag IE

| Bearer Indicator | | |
| --- | --- | --- |
| Bit 6 | Bit 5 | Direction |
| 0 | 0 | Both directions, UL and DL |
| 0 | 1 | One direction only, DL |
| 1 | 0 | One direction only, UL |
| 1 | 1 | Not used |

While the invention has been illustrated and described in detail in the drawings and the description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings the disclosure and the appended claims.

In the claims, the word "comprising" does not exclude other elements or steps, and the indefinite article "a" or "an" does not exclude a plurality. A single processor or unit may fulfil the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference find in the claims should not be construed as limiting the scope.

LIST OF REFERENCES

100 Mobile Terminal or User Equipment (UE)
101 Send Attach Request Message

102 Update Location Procedure
103 Send Create Session Request Message
104 Send Create Session Request Message
105 Credit control messaging (Communication between Packet Data Network Gateway and Charging System)
106 Send Create Session Response Message
107 Send Create Session Response Message
108 Attach Reject Message
109 Cell re-selection and no service procedure
120 Mobility Management Entity (MME)
130 Signaling Gateway (SGW)
140 Home Public Land Mobile Network (HPLMN) or Visited Public Land Mobile Network (VPLMN)
150 Home Subscriber Server (HSS)
160 Packet Data Network Gateway (PGW)
170 Online Charging System (OCS)/Policy and Charging Rules Function (PCRF)
180 Home Public Land Mobile Network (HPLMN)
200 Mobile Terminal or User Equipment (UE)
201 Send Attach Request Message
202 Update Location Procedure
203 Send Create Session Request Message
204 Send Create Session Request Message
205 Communication between Packet Data Network Gateway and Charging System
206 Send Create Session Response Message
207 Send Create Session Response Message
208 MME Mapping/Storing Procedure
209 Send Attach Accept Message including Activate Default EPS Bearer Context Message
220 Mobility Management Entity (MME)
230 Signaling Gateway (SGW)
240 Home Public Land Mobile Network (HPLMN) or Visited Public Land Mobile Network (VPLMN)
250 Home Subscriber Server (HSS)
260 Packet Data Network Gateway (PGW)
270 Online Charging System (OCS)/Policy and Charging Rules Function (PCRF)
280 Home Public Land Mobile Network (HPLMN)
400 Mobile Terminal or User Equipment (UE)
401 Successful Registration
402 Information message
403 SMS Welcome Message
403A Text of SMS Welcome Message
404a Paging Message
404b Service Request Message
405 Accept Procedure for Service Request Message
406 Short Message/Welcome Message
407 Response "Yes" Short Message
408 Response "No" Short Message
409 Answer Message
420 Mobility Management Entity (MME)
430 Signaling Gateway (SGW)
440 Home Public Land Mobile Network (HPLMN) or Visited Public Land Mobile Network (VPLMN)
450 Home Subscriber Server (HSS)
460 Packet Data Network Gateway (PGW)
470 Online Charging System (OCS)/Policy and Charging Rules Function (PCRF)
480 Home Public Land Mobile Network (HPLMN)
490 SMS Centre

What is claimed is:

1. A method for establishing an EPS Bearer for a mobile terminal in a telecommunications network, the method comprising:
a packet data network gateway receives and analyzes a negative response message from a policy and charging rules function or an online charging system comprising a cause code indicating that a customer of the mobile terminal is not subscribed to a dedicated service due to lack of a booked bucket for the service and/or not enough credit for the requested service, and
the packet data network gateway transmits, after an update location procedure of the mobile terminal is completed in the telecommunications network, a message via a signalling gateway to a Mobility Management Entity, whereby the message comprises a bearer activation key to cause the mobility management entity to activate the EPS bearer between the telecommunications network and the mobile terminal by using the received bearer activation key, wherein the bearer activation key comprises the cause code and a bearer indicator, wherein when the cause code indicates that the customer of the mobile terminal is not subscribed to the dedicated service due to lack of the booked bucket for the service and/or not enough credit for the requested service, the bearer indicator and the cause code allow an establishing of the EPS bearer with directivity for a connection between the telecommunications network and the mobile terminal.

2. The method according to claim 1, wherein the connection between the telecommunications network and the mobile terminal is downlink and/or uplink.

3. The method according to claim 1, wherein the bearer activation key is implemented in a Bearer Context Created Information Element of the Create Session Response Message.

4. The method according to claim 3, wherein the Bearer Context Created Information Element is a Bearer Quality of Service Information Element or a Bearer Flag Information Element.

5. The method according to claim 4, wherein, if the Bearer Quality of Service Information Element is chosen, the bearer indicator is located in at least one of the bits of octet 4 of the Bearer Quality of Service Information Element.

6. The method according to claim 4 wherein, if the Bearer Flag Information Element is chosen, the bearer indicator is located in at least one of the bits of Octet 4 or octet 5 of the Bearer Flag information Element.

7. The method according to claim 1, wherein, if the mobility management entity is not enabled to use a bearer indicator received from the signalling gateway, the mobility management entity maps the cause code with a corresponding bearer indicator for establishing an EPS bearer with directivity.

8. The method according to claim 7, wherein, after mapping the cause code with the corresponding bearer indicator, the mobility management entity stores the mapped bearer indicator.

9. The method according to claim 1, wherein the mobility management entity sends an Attach Accept Message together with an Activate EPS Bearer Message to the mobile terminal, whereby the Activate EPS Bearer Message comprises the stored bearer indicator.

10. A packet data network gateway for establishing an EPS Bearer for a mobile terminal in a telecommunications network, wherein said gateway is configured to:
receive and analyze a negative response message from a policy and charging rules function or an online charging system comprising a cause code indicating that a customer of the mobile terminal is not subscribed to a dedicated service due to lack of a booked bucket for the service and/or not enough credit for the requested service, and transmit, after an update location procedure of the mobile terminal is completed in the telecommunications network, a message via a signalling gateway to a Mobility Management Entity, whereby the message comprises a bearer activation key to cause the mobility management entity to activate the EPS bearer between the telecommunications network and the mobile terminal by using the received bearer activation key, wherein the bearer activation key comprises the cause code and a bearer indicator, wherein when the cause code indicates that the customer of the mobile terminal is not subscribed to the dedicated service due to lack of the booked bucket for the service and/or not enough credit for the requested service, the bearer indicator and the cause code allow an establishing of the EPS bearer with directivity for a connection between the telecommunications network and the mobile terminal.

11. A Mobility Management Entity for establishing a Default EPS Bearer for a mobile terminal in a telecommunications network configured to:

receive, from a packet data network gateway, a message via a signalling gateway, after an update location procedure of the mobile terminal is completed in the telecommunications network, whereby the message comprises a bearer activation key to cause the Mobility Management Entity to activate the EPS bearer between the telecommunications network and the mobile terminal by using the received bearer activation key, wherein the bearer activation key comprises the cause code and a bearer indicator, wherein when the cause code indicates that the customer of the mobile terminal is not subscribed to the dedicated service due to lack of the booked bucket for the service and/or not enough credit for the requested service, the bearer indicator and the cause code allow an establishing of the EPS bearer with directivity for a connection between the telecommunications network and the mobile terminal.

12. The Mobility Management Entity according to claim 11, wherein said mobility management entity comprises means for mapping a received cause code to a corresponding bearer indicator for establishing an EPS bearer with directivity.

13. The method according to claim 1, wherein the bearer activation key indicates a directivity.

* * * * *